US012602544B2

(12) United States Patent
    Yoshioka

(10) Patent No.: US 12,602,544 B2
(45) Date of Patent: Apr. 14, 2026

(54) INFORMATION PROCESSING APPARATUS, OPERATION METHOD, AND RECORDING MEDIUM

(71) Applicant: CASIO COMPUTER CO., LTD., Shibuya-ku (JP)

(72) Inventor: Kosaku Yoshioka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 147 days.

(21) Appl. No.: 18/438,923

(22) Filed: Feb. 12, 2024

(65) Prior Publication Data

US 2024/0289547 A1     Aug. 29, 2024

(30) Foreign Application Priority Data

Feb. 27, 2023     (JP) ................................. 2023-027965

(51) Int. Cl.
    *G06F 40/242*          (2020.01)
    *G06F 3/0481*          (2022.01)
    *G06F 3/04886*         (2022.01)

(52) U.S. Cl.
    CPC .......... *G06F 40/242* (2020.01); *G06F 3/0481* (2013.01); *G06F 3/04886* (2013.01); *G06F 2203/04803* (2013.01)

(58) Field of Classification Search
    CPC ........ G06F 16/34; G06F 40/10; G06F 40/242; G06F 3/0237; G06F 40/169; G06F 3/0488; G06F 40/171; G06F 16/58; G06F 2203/04803; G06F 3/0481; G06F 3/04886
    See application file for complete search history.

(56) References Cited

U.S. PATENT DOCUMENTS

| | | | | |
|---|---|---|---|---|
| 8,706,685 | B1 * | 4/2014 | Smith ................. | G06F 16/9558 707/608 |
| 8,832,550 | B2 | 9/2014 | Abe | |
| 9,460,422 | B2 * | 10/2016 | Reter ................. | G06F 15/0266 |
| 10,339,218 | B1 * | 7/2019 | Lakshmanan ......... | G06F 40/242 |
| 10,387,001 | B2 * | 8/2019 | Jang ..................... | G06F 3/0481 |
| 12,050,770 | B2 * | 7/2024 | Ive ...................... | G06F 3/03547 |
| 12,449,960 | B2 * | 10/2025 | Fan ...................... | G06F 3/0481 |

(Continued)

FOREIGN PATENT DOCUMENTS

| | | | |
|---|---|---|---|
| JP | 2007058555 A | 3/2007 |
| JP | 2008009606 A | 1/2008 |

(Continued)

OTHER PUBLICATIONS

Extended European Search Report (EESR) dated Jun. 21, 2024, issued in counterpart European Application No. 24157595.0.

(Continued)

*Primary Examiner* — Abdelali Serrou
(74) *Attorney, Agent, or Firm* — Holtz, Holtz & Volek PC

(57)          ABSTRACT

An information processing apparatus executes: processing of dividing an electronic book area in which an electronic book is displayed into a first display area and a second display area, and displaying contents of the electronic book and a dictionary area related to a dictionary function in the first display area and the second display area, respectively, according to an operation of a user; and processing of executing dictionary search of a character string selected by the user in the first display area.

6 Claims, 15 Drawing Sheets

(56) References Cited

U.S. PATENT DOCUMENTS

| | | | |
|---|---|---|---|
| 2013/0167023 A1* | 6/2013 | Rachi | G06F 40/242 |
| | | | 715/259 |
| 2022/0308752 A1* | 9/2022 | Fu | G06F 9/451 |

FOREIGN PATENT DOCUMENTS

| | | | |
|---|---|---|---|
| JP | 2012113352 A | 6/2012 |
| JP | 2017045481 A | 3/2017 |

OTHER PUBLICATIONS

"Yet another dictionary look up and text translator", Nov. 7, 2017, pp. 1-4, XP093171262, Retrieved from the Internet: URL:https://web.archive.org/web/20171107133040/https://addons.mozilla.org/en-US/firefox/addon/yadattawa/.

* cited by examiner

USER C

USER B

USER A

DICTIONARY LIST

ELECTRONIC BOOK LIST

DICTIONARY LIST

- ○○ JAPANESE DICTIONARY
- △△ JAPANESE DICTIONARY
- ○○ CHINESE CHARACTER DICTIONARY
- △△ ENGLISH-JAPANESE DICTIONARY
- ○○ JAPANESE-ENGLISH DICTIONARY

ELECTRONIC BOOK LIST

- ○○ BASIC ENGLISH GRAMMAR
- △△ TEXTBOOK
- ○○ REFERENCE BOOK
- △△ TEST WORKBOOK (2022 EDITION)
- △△ TEST WORKBOOK (2021 EDITION)

Figure 10:
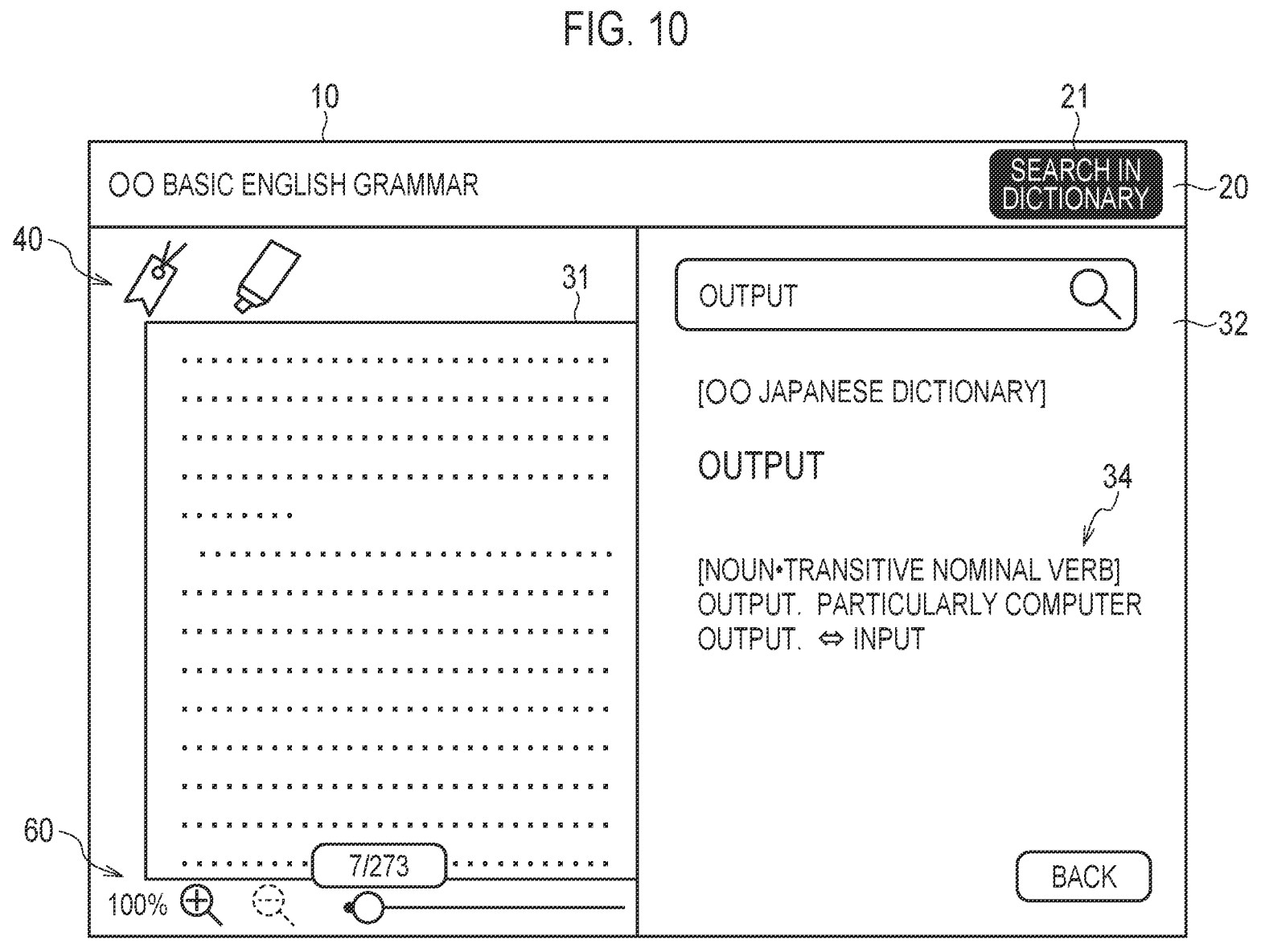

○○ BASIC ENGLISH GRAMMAR

SEARCH IN DICTIONARY

OUTPUT

[○○ JAPANESE DICTIONARY]

OUTPUT

[NOUN・TRANSITIVE NOMINAL VERB]
OUTPUT. PARTICULARLY COMPUTER
OUTPUT. ⇔ INPUT

BACK

OO BASIC ENGLISH GRAMMAR

INPUT SELECTED CHARACTER TO DICTIONARY

SEARCH IN DICTIONARY

Figure 13:
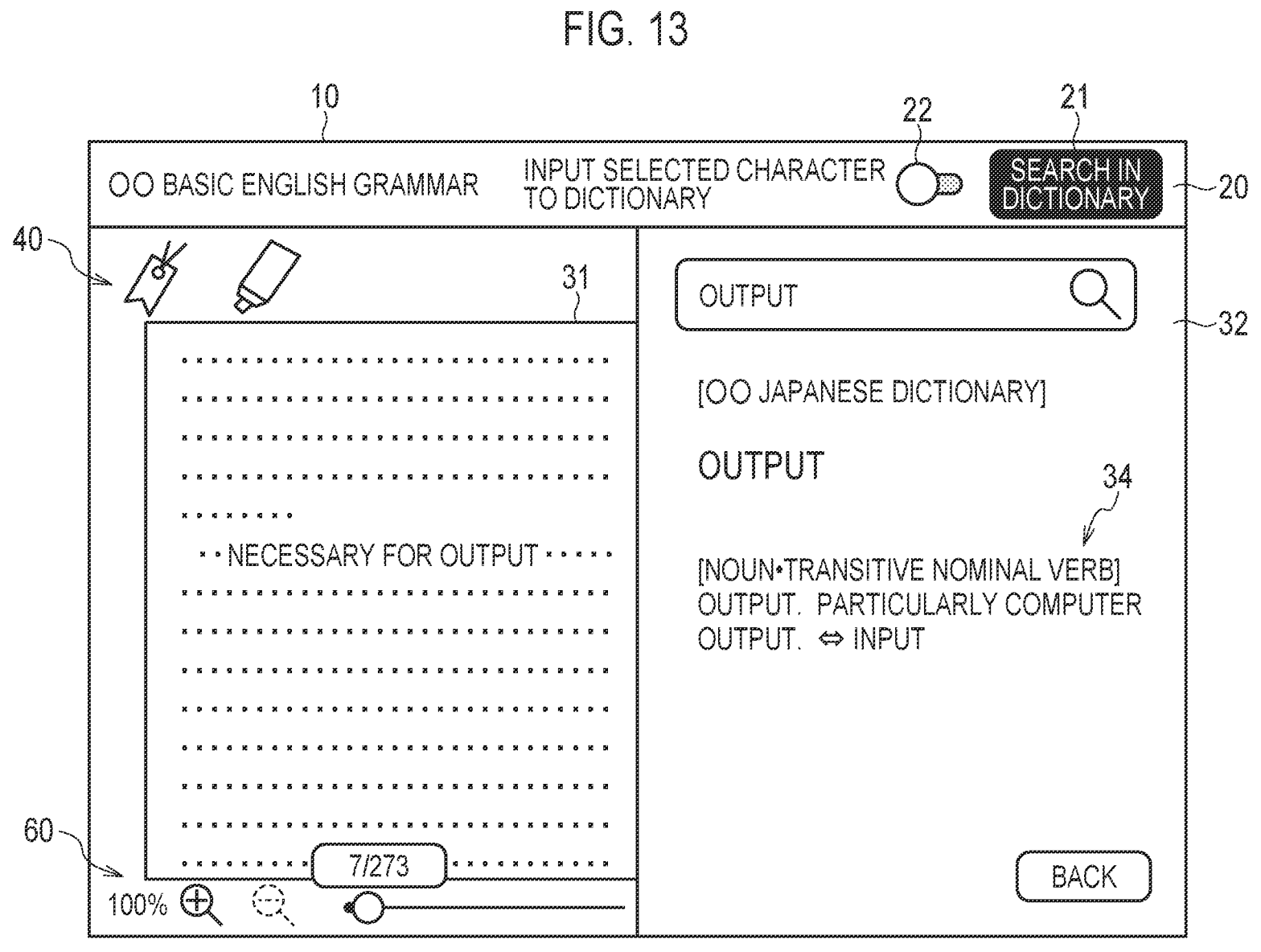

OO BASIC ENGLISH GRAMMAR    INPUT SELECTED CHARACTER
TO DICTIONARY

SEARCH IN DICTIONARY

OUTPUT

[OO JAPANESE DICTIONARY]

OUTPUT

[NOUN·TRANSITIVE NOMINAL VERB]
OUTPUT. PARTICULARLY COMPUTER
OUTPUT. ⇔ INPUT

···· NECESSARY FOR OUTPUT ····

Figure 14:
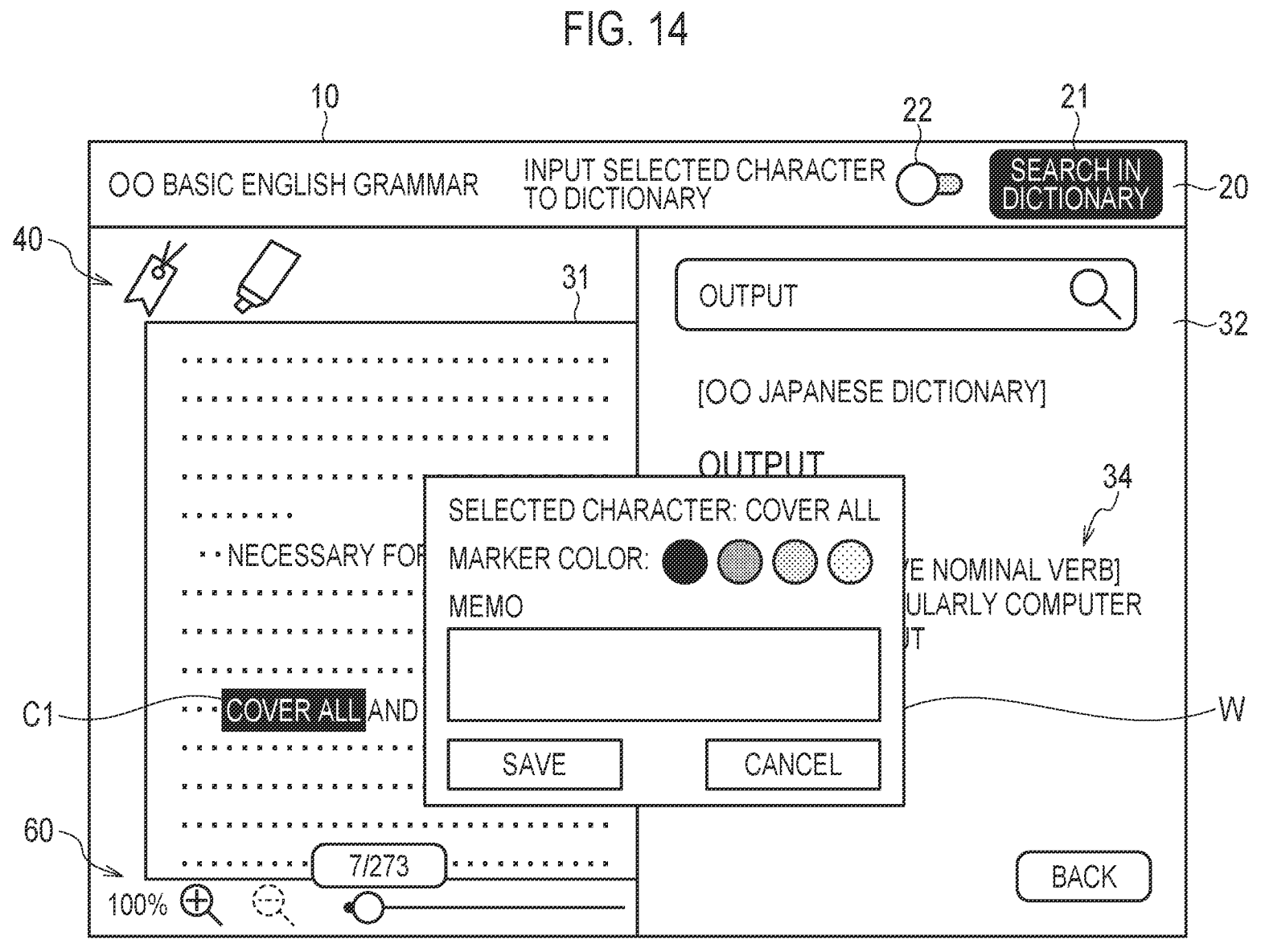

OO BASIC ENGLISH GRAMMAR

INPUT SELECTED CHARACTER TO DICTIONARY

SEARCH IN DICTIONARY

OUTPUT

[OO JAPANESE DICTIONARY]

OUTPUT

SELECTED CHARACTER: COVER ALL

MARKER COLOR:

MEMO

SAVE          CANCEL

E NOMINAL VERB]
ULARLY COMPUTER
T

·· NECESSARY FOR

COVER ALL AND

7/273

100%

BACK 10    21    22    20    32    34    W    31    40    C1    60

INFORMATION PROCESSING APPARATUS, OPERATION METHOD, AND RECORDING MEDIUM

CROSS-REFERENCE TO RELATED APPLICATIONS

This application is based upon and calms the benefit of priority from Japanese Patent Application No. 2023-027965 filed on Feb. 27, 2023, the entire contents of which are incorporated herein by reference.

BACKGROUND

Technical Field

The present disclosure relates to an information processing apparatus, an operation method, and a recording medium.

Related Art

Currently, as disclosed in JP 2008-009606 A, a mechanism that displays an electronic book on an information processing apparatus based on electronic book data has become widespread, and JP 2008-009606 A describes a technique for automatically setting an attribute to bookmark information of the electronic book. Furthermore, the above literature also describes acquiring from a dictionary database a meaning of a word at a position to which the bookmark information is assigned, and displaying the meaning as a comment for the bookmark information.

SUMMARY

An information processing apparatus according to one aspect of the present disclosure includes a controller execute: processing of dividing an electronic book area in which an electronic book is displayed into a first display area and a second display area, and causing a display to display contents of the electronic book and a dictionary area related to a dictionary function in the first display area and the second display area, respectively, according to an operation of a user, and processing of executing dictionary search of a character string selected by the user in the first display area.

An operation method according to one aspect of the present disclosure is an operation method of an information processing apparatus, and includes: dividing an electronic book area in which an electronic book is displayed into a first display area and a second display area, and causing a display to display contents of the electronic book and a dictionary area related to a dictionary function in the first display area and the second display area, respectively, according to an operation of a user; and executing dictionary search of a character string selected by the user in the first display area.

A recording medium according to one aspect of the present disclosure is a recording medium that can be read by a computer, and records a program, the program causing the computer to execute: a procedure of dividing an electronic book area in which an electronic book is displayed into a first display area and a second display area, and displaying contents of the electronic book and a dictionary area related to a dictionary function in the first display area and the second display area, respectively, according to an operation of a user; and a procedure of executing dictionary search of a character string selected by the user in the first display area.

BRIEF DESCRIPTION OF THE DRAWINGS

FIG. 4 is a flowchart of processing performed by the server apparatus according to the first embodiment;

FIG. 10 is a view illustrating still another example of the display state of the electronic book;

FIG. 12 is a view illustrating an example of a display state of an electronic book;

FIG. 13 is a view illustrating another example of the display state of the electronic book;

FIG. 14 is a view illustrating still another example of the display state of the electronic book.

DETAILED DESCRIPTION

First Embodiment

Figure 1:
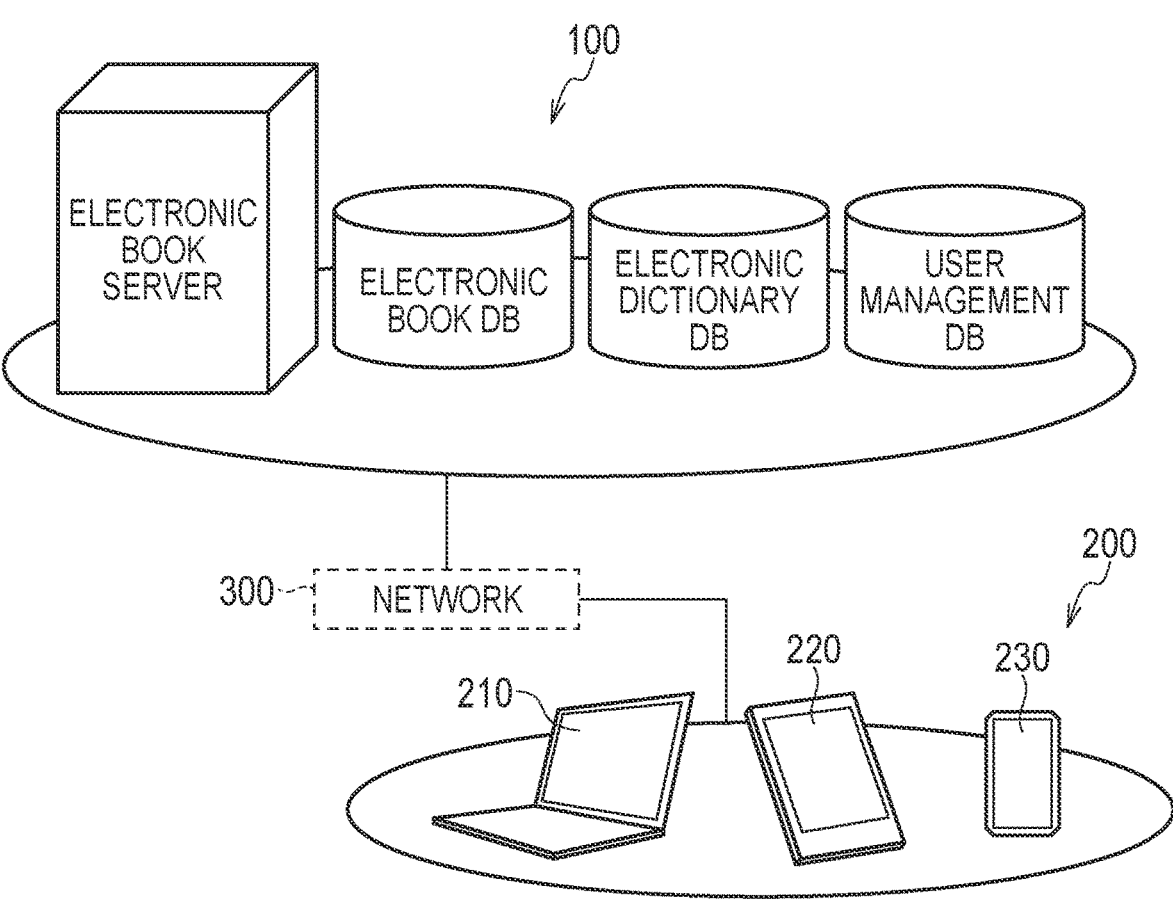
FIG. 1 is a view illustrating a configuration of a system according to a first embodiment.
Figure 2:
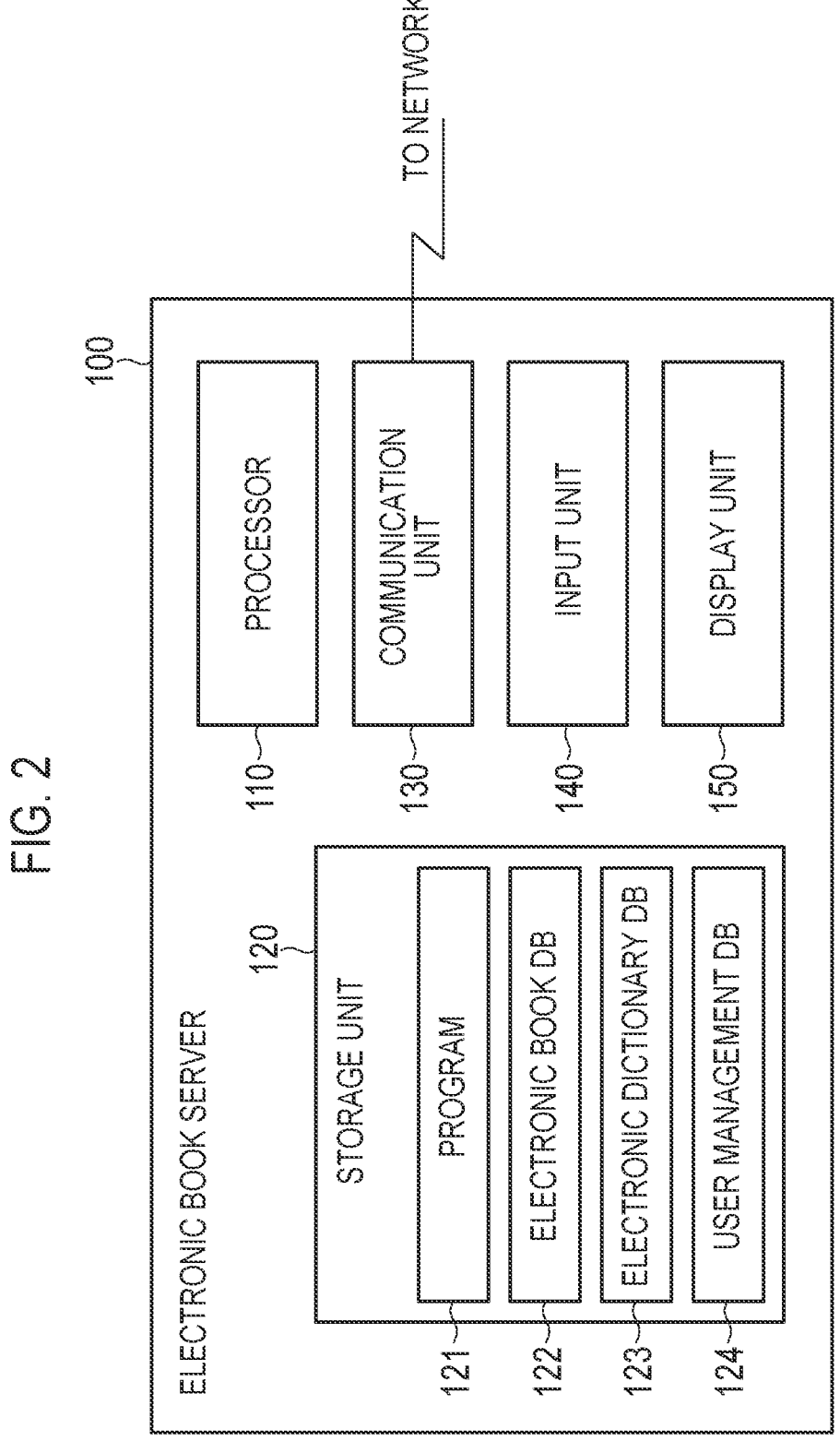
FIG. 2 is a view illustrating a configuration of a server apparatus according to the first embodiment.
Figure 3:
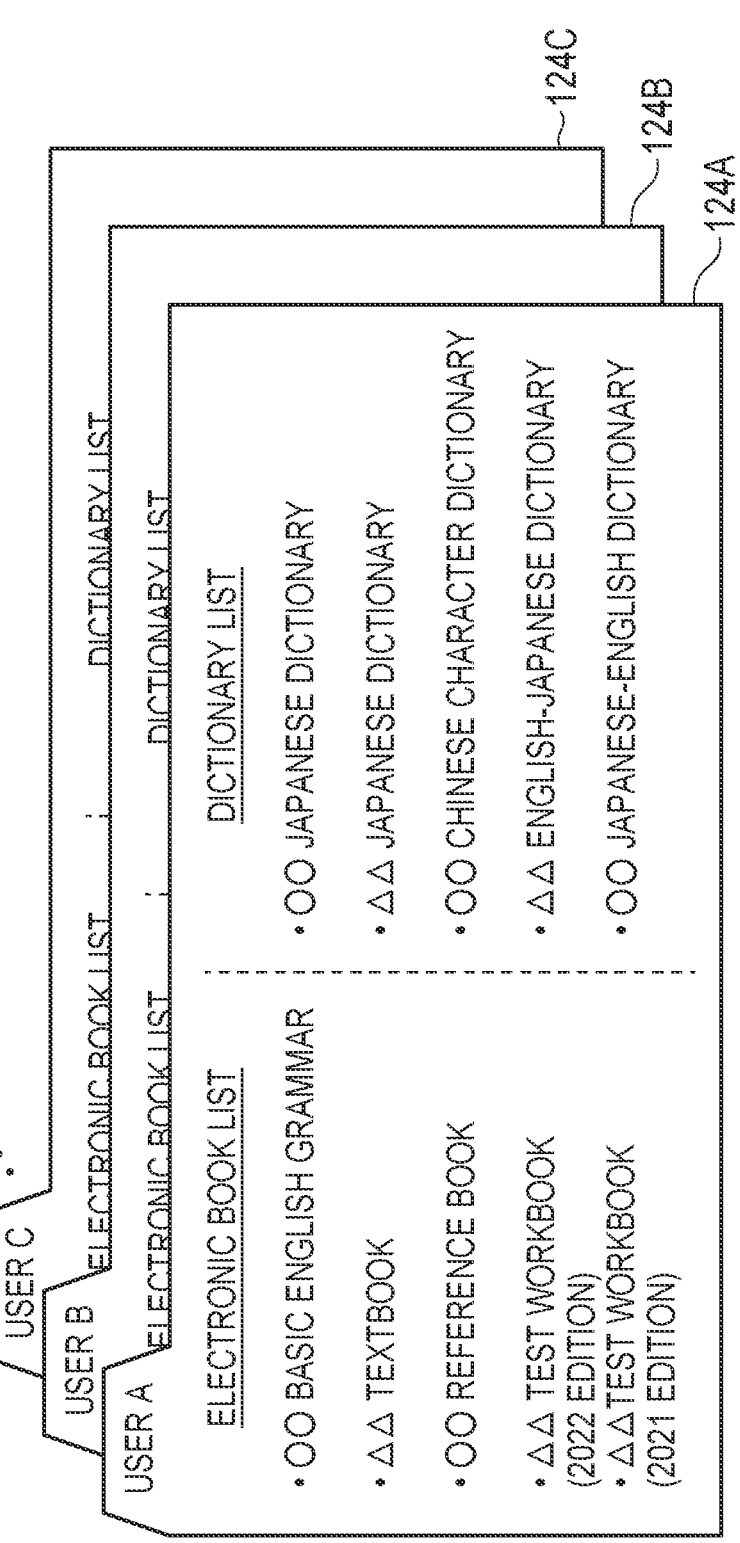
FIG. 3 is a view illustrating user data in a user management database.

FIG. 1 is a view illustrating a configuration of a system according to the present embodiment. FIG. 2 is a view illustrating a configuration of a server apparatus 100 according to the present embodiment. FIG. 3 is a view illustrating user data in a user management database.

The system illustrated in FIG. 1 is an electronic book system that causes a client terminal 200 to display an electronic book by accessing electronic book data managed by the server apparatus 100 via a network 300. This electronic book system includes the server apparatus 100 that provides an electronic book service, and the client terminal 200 that accesses the server apparatus 100 via the network 300 such as the Internet.

The present embodiment will describe as an example a case where the electronic book system is configured as a web application system, and an electronic book is browsed on a web browser of the client terminal 200. In this regard, the electronic book system is not limited to the web application system, and may be configured to browse the electronic book using a reader application downloaded in advance to the client terminal 200.

The client terminal 200 is a terminal directly operated by a user. In the client terminal 200, an application program such as a web browser that displays an electronic book only needs to be operated, and the client terminal 200 may be a notebook type client terminal 210, a tablet type client terminal 220, or a smartphone type client terminal 230 as illustrated in FIG. 1.

The server apparatus 100 is an example of an information processing apparatus, and includes a processor 110, a storage unit 120, a communication unit 130, an input unit 140, and a display 150 as illustrated in FIG. 2.

The processor 110 is, for example, a Central Processing Unit (CPU) or the like. When the processor 110 executes a program 121 stored in the storage unit 120, a computer that is the server apparatus 100 performs processing illustrated in FIG. 4 to be described later.

The storage unit 120 includes, for example, a semiconductor memory that operates as a main storage device such as a Random Access Memory (RAM) or a Read Only Memory (ROM), and a storage that operates as an auxiliary storage device such as a Solid State Drive (SSD) or a Hard Disk Drive (HDD).

The storage unit 120 stores the program 121 executed by the processor 110, and various databases (an electronic book database 122, an electronic dictionary database 123, and a user management database 124) used when the program 121 is executed.

The electronic book database 122 is a set of electronic book data related to various books. The electronic book data includes at least bibliographic information such as a title and contents information of books. The electronic dictionary database 123 is a set of dictionary data related to various dictionaries such as an English-Japanese dictionary, a German-Japanese dictionary, a French-Japanese dictionary, and a Japanese dictionary. The dictionary data includes at least words that are headwords, and explanatory information such as translations, meanings, example sentences, and explanations associated with the headwords in association with each other.

The user management database 124 is a set of user data related to the user of the electronic book system. The user data includes authentication information such as a user ID and a password, information for specifying an electronic book that has been, for example, purchased and thereby become available to the user, and information for specifying an electronic dictionary that has, for example, purchased and thereby become available to the user. For example, FIG. 3 illustrates user data (user data 124A, user data 124B, and user data 124C) managed per user. In the example illustrated in FIG. 3, the user data 124A indicates that a user A can browse five types of electronic books, and five types of electronic dictionaries are available.

The communication unit 130 is a communication module that communicates with the server apparatus 100 via the network 300. The input unit 140 is a keyboard, a mouse, a touch panel, or the like. The display 150 is a liquid crystal display, an organic EL display, or the like.

The server apparatus 100 configured as described above is configured to provide an electronic book service in response to a request from the client terminal 200, and enable use of the dictionary function in the electronic book service. Hereinafter, this point will be described in more detail.

Figure 4:
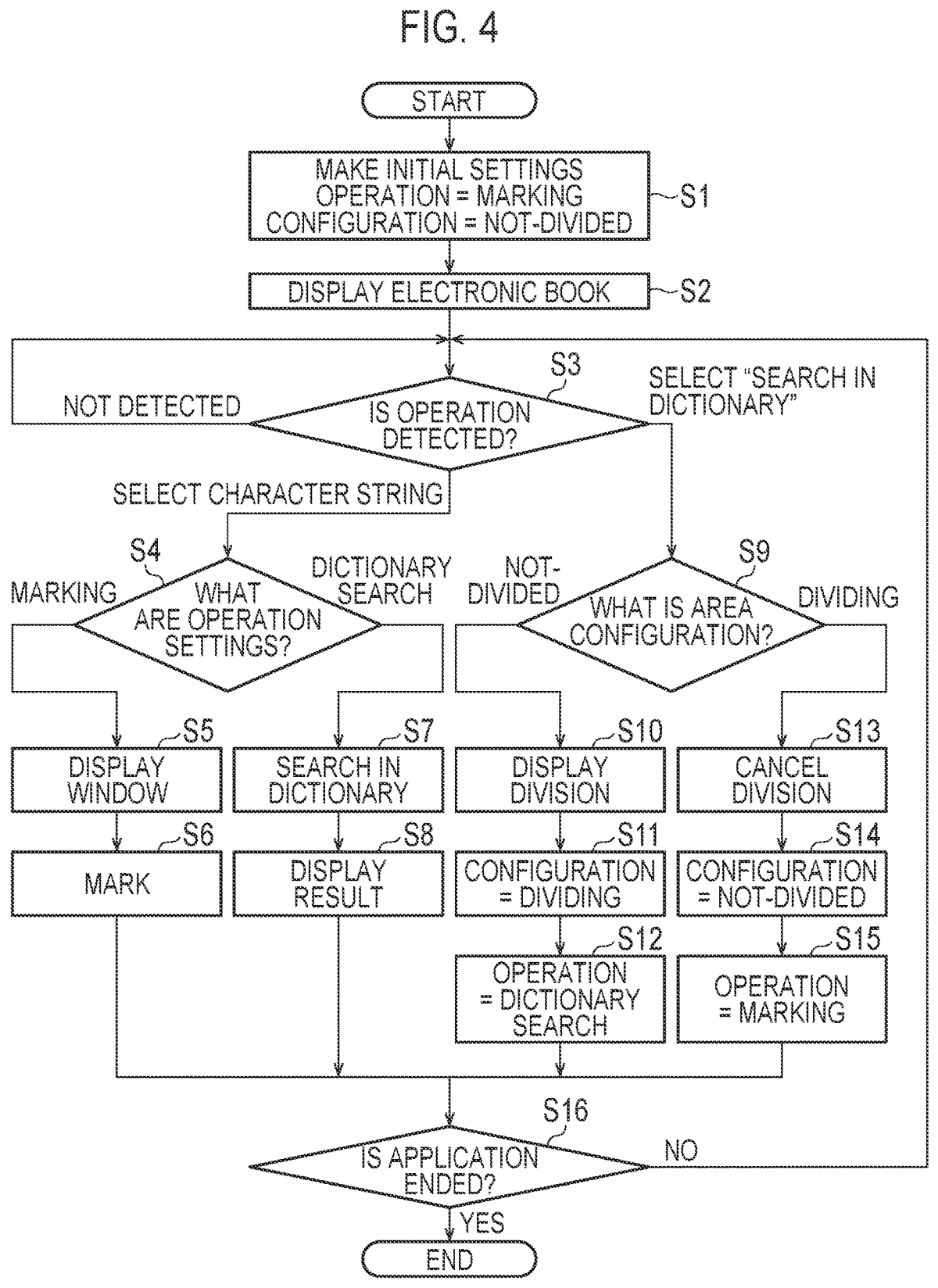

FIG. 4 is a flowchart of processing performed by the server apparatus 100 according to the present embodiment. FIGS. 5 to 10 are views illustrating display states of an electronic book. Hereinafter, a change in the display states caused by a user's operation on the web browser that displays the electronic book will be more specifically described with reference to FIGS. 4 to 10.

First, the user activates the web browser installed in the client terminal 200, logs in to the electronic book system, and selects an electronic book to browse to start the processing illustrated in FIG. 4.

When the processing illustrated in FIG. 4 is started, the server apparatus 100 makes initial settings (step S1). Here, the server apparatus 100 sets an operation on a character string selected on the electronic book, and a configuration of an electronic book area 10 to be described later.

The operation on the selected character string refers to an operation performed in association with a specific character string when the user explicitly selects the specific character string in contents of the electronic book displayed on the client terminal 200. In step S1, the operation on the selected character string is set to "marking".

Furthermore, in this embodiment, the configuration of the electronic book area 10 is set to one of the configuration "dividing" (see FIG. 8) where an area 30 includes a display area 31 and a dictionary area 32, and a configuration "not-divided" (see FIG. 5) where the area 30 includes a display area 50 wider than the display area 31. In step S1, the configuration of the electronic book area 10 is set to "not-divided".

Figure 5:
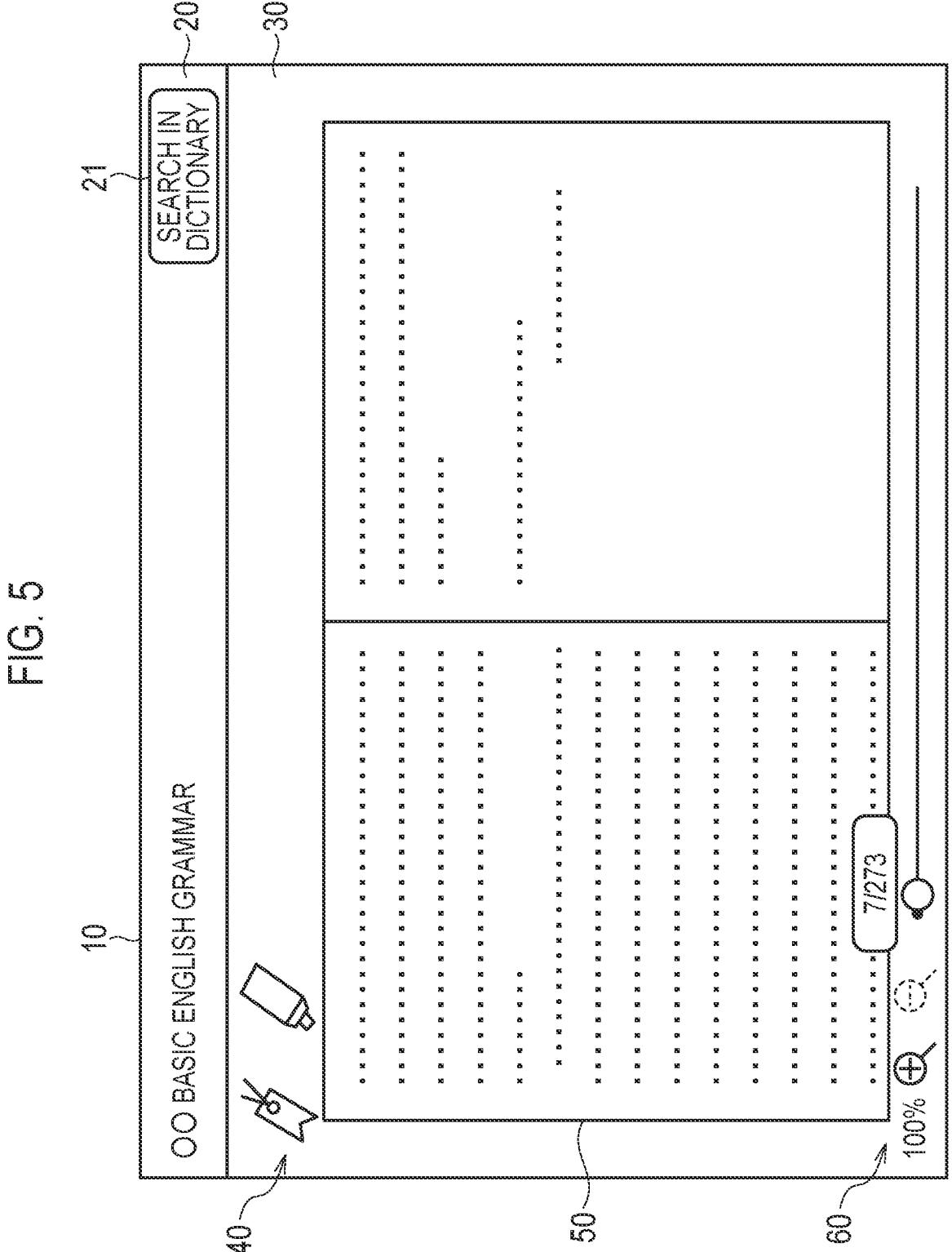
FIG. 5 is a view illustrating an example of a display state of an electronic book.

When the initial settings are made, the server apparatus 100 causes the client terminal 200 to display the selected electronic book (step S2). FIG. 5 illustrates an example of the display state of the electronic book (electronic book area 10) displayed on the web browser of the client terminal 200 in step S2, and illustrates a non-divided state where the configuration of the electronic book area 10 is the "not-divided" configuration.

As illustrated in FIG. 5, the electronic book area 10 includes an area 20 that displays a title of the electronic book and the like, and the area 30 that displays contents of the electronic book and the like. The area 20 is provided with a button 21 that enables use of the dictionary function while the electronic book is browsed. The area 30 includes the display area 50 that displays the contents of the electronic book, and is provided with an icon 40 for setting a bookmark and a marker and an icon 60 for adjusting a display magnification of the contents of the electronic book around this display area 50. Furthermore, most of the area 30 is occupied by the display area 50 that displays the contents of the electronic book to make it possible to comfortably browse the electronic book.

Subsequently, the server apparatus 100 monitors a user's input operation (step S3). Here, the server apparatus 100 monitors, for example, an operation of selecting a character string in an area (the display area 50 in FIG. 5 and the display area 31 in FIG. 8) in which the contents of the electronic book are displayed, and an operation on the button 21 provided to the area 20 and displayed as "search in dictionary", and detects these operations.

Figure 6:
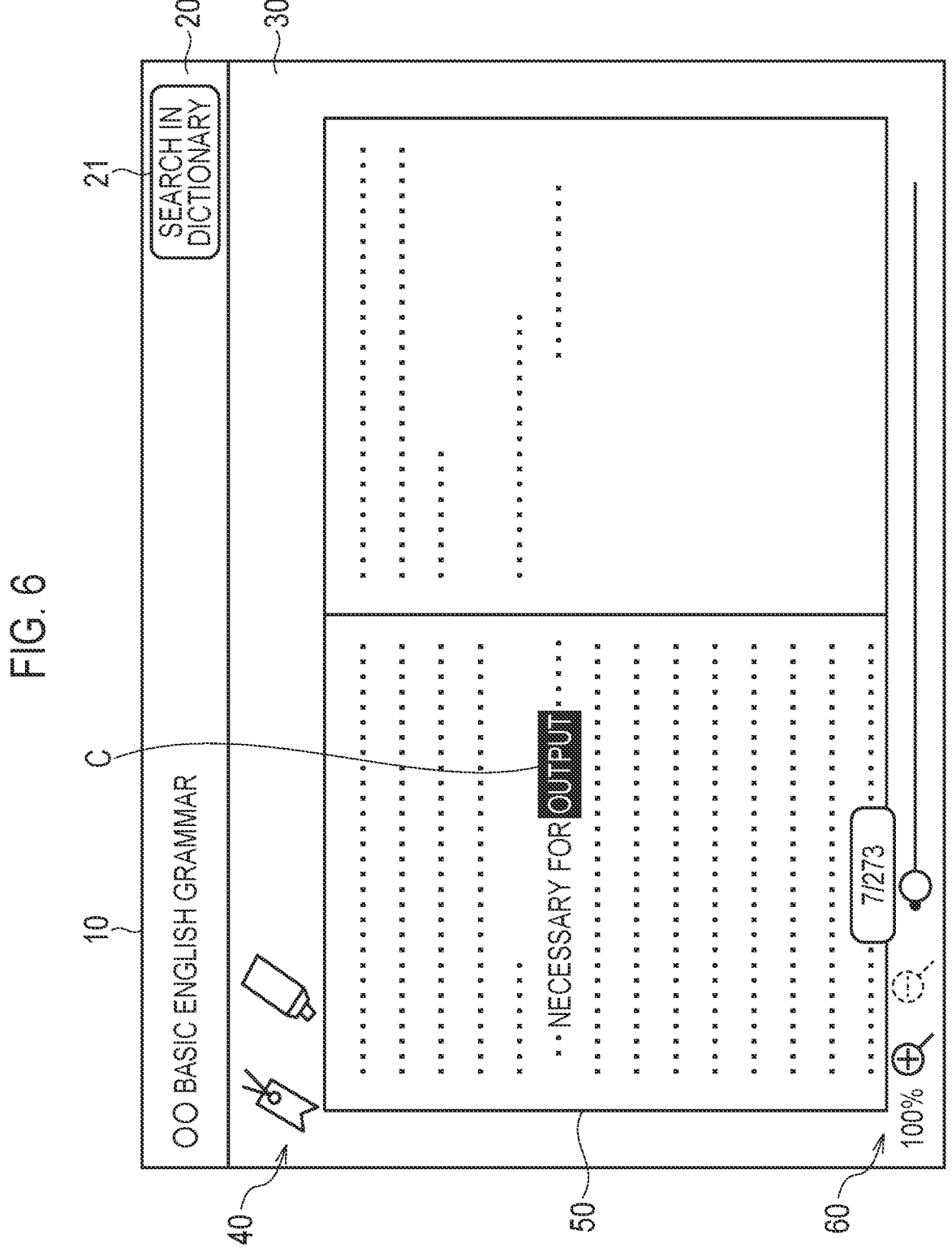
FIG. 6 is a view illustrating another example of the display state of the electronic book.

For example, as illustrated in FIG. 6, when the user designates a range inside the display area 50, and selects a character string "output", the server apparatus 100 detects selection of the character string in step S3 (step S3), and determines the settings of the operation on a selected character string C "output" (step S4).

Figure 7:
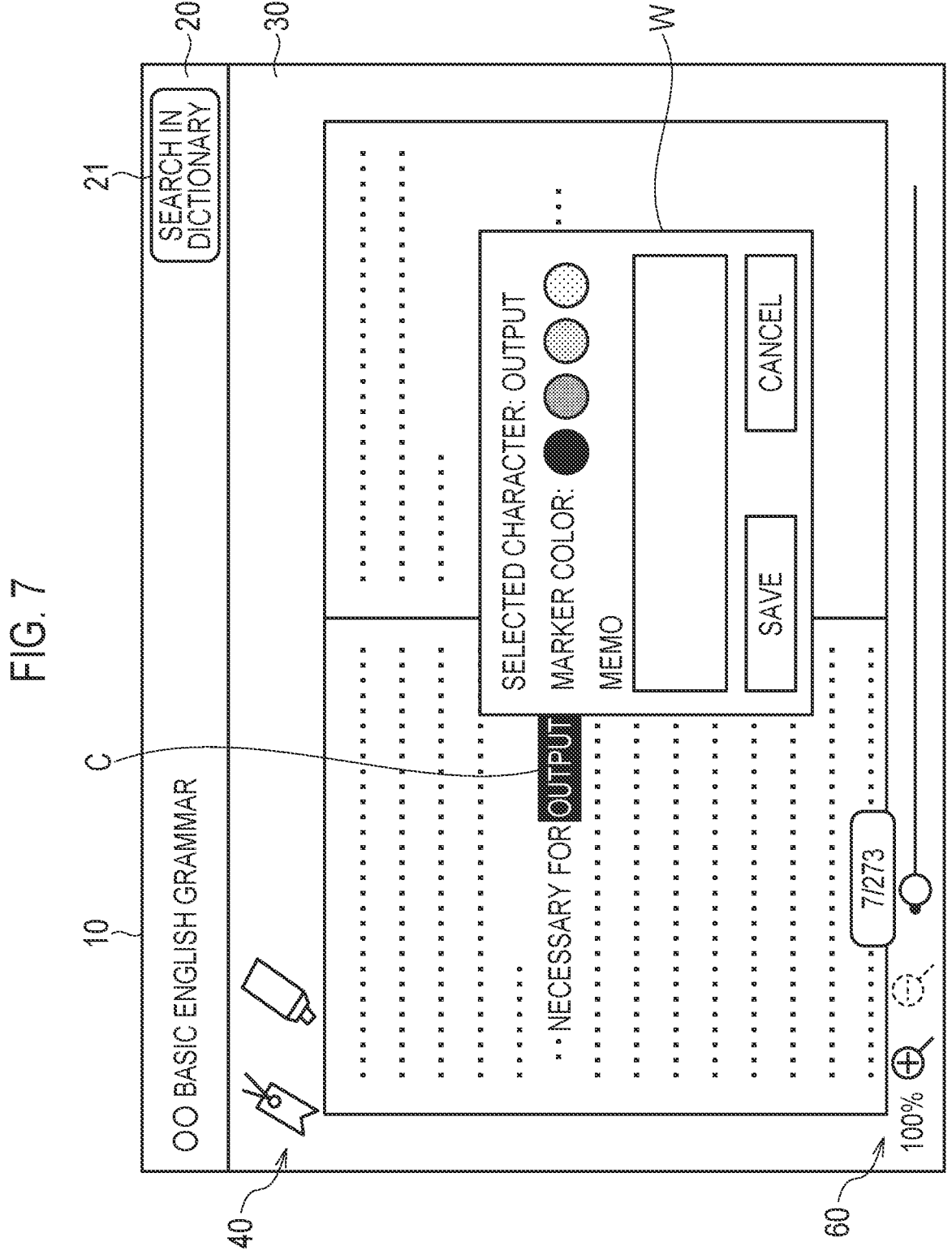
FIG. 7 is a view illustrating still another example of the display state of the electronic book.

In a case where "marking" is set to the operation on the selected character string such as a case where the settings are not changed from the initial settings, the server apparatus 100 displays a window W for setting a marker to the selected character string C in the electronic book area 10 as illustrated in FIG. 7 (step S5). The window W displays the selected character string (output in this case), and is further provided with an area for selecting the color of the marker and an area for inputting a comment to be recorded together with the marker.

When the user selects or inputs necessary information on the window W and selects a save button, the server apparatus 100 sets the marker to the character string C selected in the display area 50 (step S6). Note that, although the server apparatus 100 has a function of setting display/hide of the set marker, a function of displaying a list of set markers, and the like, detailed description of this point will be omitted.

Next, a case where an operation on the button 21 is detected will be described. When, for example, the user selects the button 21 in the non-divided state as illustrated in FIG. 5, the server apparatus 100 detects that the button 21 displayed as "search in dictionary" has been selected in step S3, and determines the configuration of the electronic book area 10 (step S9).

Figure 8:
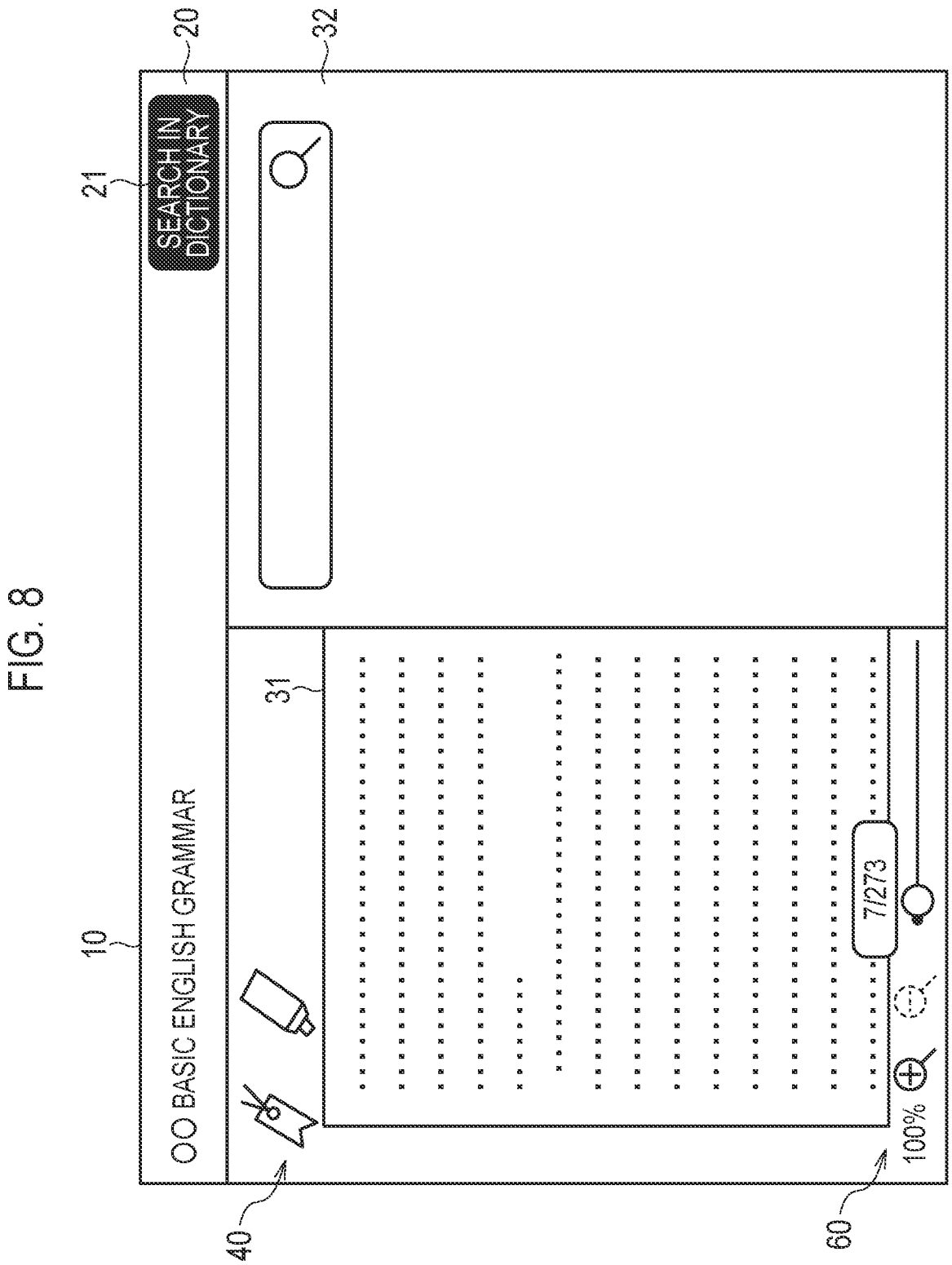
FIG. 8 is a view illustrating still another example of the display state of the electronic book.

In a case where "not-divided" is set to the configuration of the electronic book area 10 such as a case where the settings are not changed from the initial settings, the server apparatus 100 divides the electronic book area 10 (step S10), and causes the electronic book area 10 to display the dictionary area 32. Here, for example, as illustrated in FIG. 8, the server apparatus 100 divides the area 30 into right and left areas, and causes the right area to display the dictionary area 32 related to the dictionary function. The dictionary area 32 is provided with a search window for inputting a character string to search for. Furthermore, the server apparatus 100 provides the display area 31 narrower than the display area 50 in the left area, and causes the display area 31 to display the contents of the electronic book. Furthermore, the server apparatus 100 arranges the icon 40 and the icon 60 around the display area 31.

When the electronic book area 10 is divided, the server apparatus 100 sets the configuration of the electronic book area 10 to "dividing" (step S11), and further sets the operation on the character string selected on the electronic book to "dictionary search" (step S12).

Note that arrangement of each area illustrated in FIG. 8 is an example of the arrangement in the divided state where the configuration of the electronic book area 10 is the "dividing" configuration. The arrangement of each area in the divided state is not limited to this example. For example, the dictionary area 32 may be arranged at any position of upper, lower, left, and right sides in the electronic book area 10. Alternatively, the dictionary area 32 does not necessarily need to be provided crossing the area 30 in a longitudinal or lateral direction, and may be arranged in, for example, an upper right portion or a lower right portion in the electronic book area 10.

The dictionary area 32 only needs to be arranged without overlapping the area that displays the contents of the electronic book. That is, the server apparatus 100 only needs to perform processing of dividing the electronic book area 10 in which the electronic book is displayed, causing the display area 31 (first display area) that is part of the electronic book area 10 to display the contents of the electronic book, and causing the dictionary area 32 (second display area) that is another part of the electronic book area 10 to display the dictionary area related to the dictionary function according to the user's operation (the operation of selecting the button 21 in this example).

Furthermore, although FIG. 8 illustrates an example where a display magnification of the contents of the electronic book displayed in the display area 31 is not changed from a display magnification in the non-divided state, the display magnification may be changed. Since the display area 31 is narrower than the display area 50, the server apparatus 100 may automatically lower the magnification such that, for example, all of the contents of the electronic book displayed in the display area 50 are displayed in the display area 31.

Figure 9:
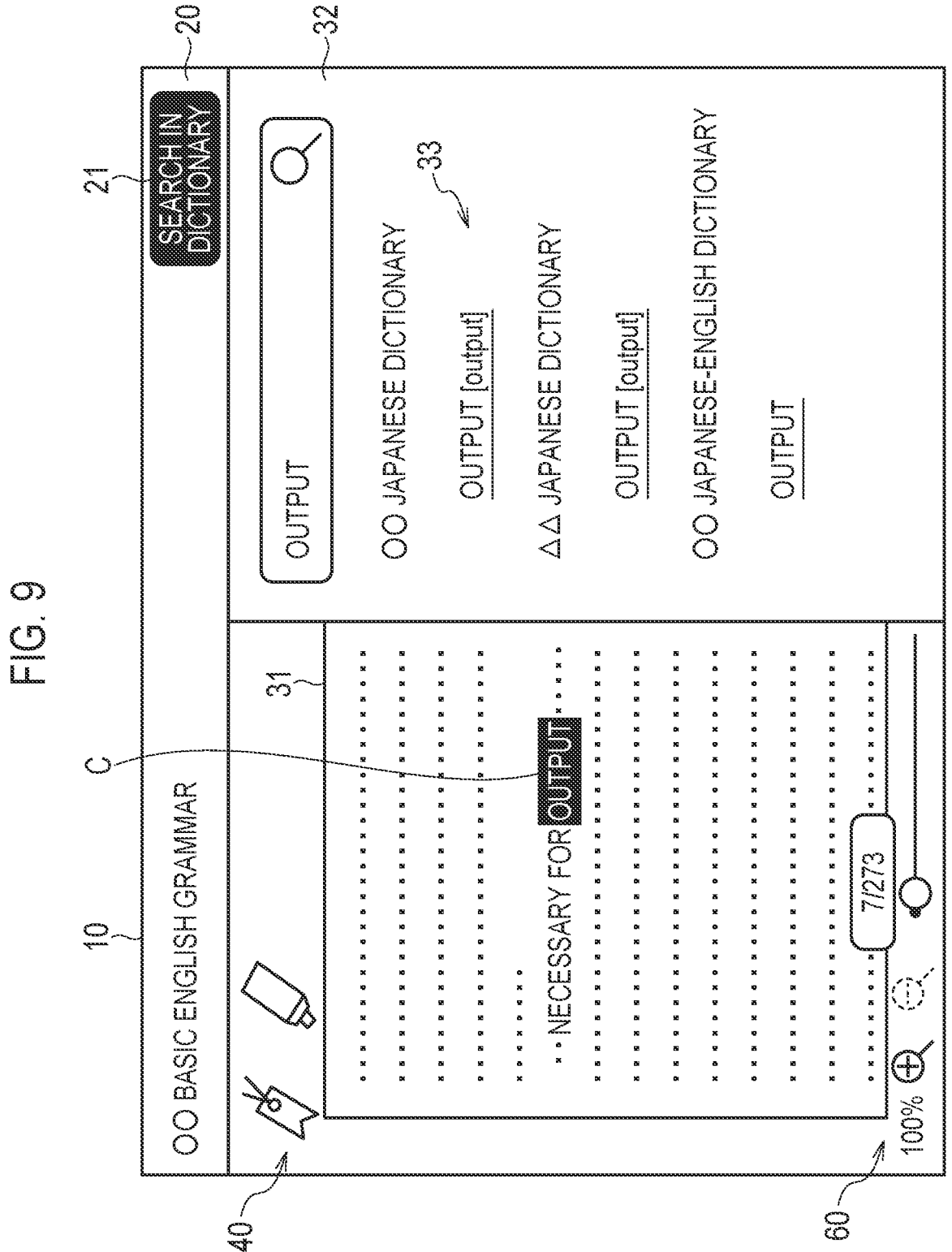
FIG. 9 is a view illustrating still another example of the display state of the electronic book.

When the user selects the character string "output" by designating the range in the display area 31 as illustrated in FIG. 9 in a state where the dictionary area 32 is displayed, the server apparatus 100 detects selection of the character string in step S3 (step S3), and determines the settings of the operation on the selected character string C "output" (step S4).

In the divided state, since "dictionary search" is set to the operation on the selected character string, the server apparatus 100 performs dictionary search on the selected character string (step S7). Here, the server apparatus 100 automatically inputs the selected character string "output" to a search window of the dictionary area 32, and performs dictionary search on this character string "output". The dictionary database used for search is specified based on user data of this user. That is, the server apparatus 100 searches for this character string in one or more dictionary databases associated with the user in advance. In a case where, for example, the user A uses the electronic book, "output" is searched in five dictionaries registered in the user data 124A in FIG. 3.

Subsequently, the server apparatus 100 causes the dictionary area 32 to display a dictionary search result (step S8). Here, for example, as illustrated in FIG. 9, the server apparatus 100 displays a headword list 33 that is a list of character strings "output" registered as headwords in the dictionary database.

Each item of the headword list 33 is displayed such that a dictionary name is displayed, that is, in which dictionary a headword is in can be specified. When the user selects one of headwords from the headword list 33, the server apparatus 100 causes the dictionary area 32 to display detailed information (explanation sentence 34) searched from the dictionary database associated with the selected headword as illustrated in FIG. 10. As described above, the information that makes it possible to specify the dictionary is displayed in the headword list 33, so that the user can easily access appropriate dictionary information.

When the user selects the button 21 in the divided state where the dictionary area 32 is displayed as illustrated in FIGS. 8 to 10, the server apparatus 100 detects that the button 21 displayed as "search in dictionary" has been selected in step S3, and determines the configuration of the electronic book area 10 (step S9).

In this case, since "dividing" is set to the configuration of the electronic book area 10, the server apparatus 100 cancels division of the electronic book area 10 (step S13). Here, the server apparatus 100 changes the dictionary area 32 to hide, and resets the configuration of the electronic book area 10 to the configuration illustrated in FIG. 5. That is, the server apparatus 100 cancels division of the electronic book area 10 according to the user's operation of selecting the button 21, and causes the display area 50 wider than the display area 31 to display the contents of the electronic book.

When division of the electronic book area 10 is cancelled, the server apparatus 100 sets the configuration of the electronic book area 10 to "not-divided" (step S14), and further sets the operation on the character string selected on the electronic book to "marking" (step S15). That is, the server apparatus 100 resets the configuration of the electronic book area 10 and the settings of the operation on the selected character string to the initial settings.

Note that, similar to in step S10, in step S13, too, the server apparatus 100 may or may not change the display magnification of the contents of the electronic book. Furthermore, whether or not to change the display magnification may be set such that the user can freely select whether or not to change the display magnification.

As described above, as illustrated in FIGS. 5 and 8, the server apparatus 100 that executes the processing illustrated in FIG. 4 performs processing of dividing the electronic book area 10 in which the electronic book is displayed, causing the display area 31 that is part of the electronic book area 10 to display the contents of the electronic book, and causing the dictionary area 32 that is another part of the electronic book area 10 to display the dictionary area related to the dictionary function according to the user's operation. In this way, even when the electronic book area 10 is divided, and the dictionary area 32 is displayed in an area different from the display area 31, the dictionary search result to be displayed in the dictionary area 32 is not displayed overlapping the contents of the electronic book displayed in the display area 31. Consequently, even when the user performs a predetermined operation of switching the display state to use the dictionary function while browsing the electronic book, the user is not hindered from browsing the electronic book. Consequently, the server apparatus 100 can use the dictionary function while maintaining the comfortable reading environment of the electronic book.

Furthermore, as described in step S12 in FIG. 4, the server apparatus 100 performs processing of switching the operation on the character string selected in the display area 31 to dictionary search for the character string when the electronic book area 10 is divided and the dictionary area 32 is displayed. As a result, as illustrated in FIG. 7, even in a case where a certain operation (e.g., marking) is performed in response to selection of the character string before division, a different operation (dictionary search) matching the display state is performed after division with respect to the same operation that is selection of the character string. Consequently, the user can save a labor of changing the operation settings of selection of the character string in addition to the operation of switching the display state. Consequently, the server apparatus 100 can appropriately make a function such as marking that is conventionally used and a dictionary function compatible without imposing an additional burden on the user.

Furthermore, when the operation on the character string is dictionary search for the character string, the server apparatus 100 performs processing of causing the dictionary area 32 to display the dictionary search result according to the operation of the user selecting the character string in the display area 31. Consequently, as illustrated in FIG. 9, the user can obtain the dictionary search result for the character string only by selecting this character string in the display area 31. Consequently, the server apparatus 100 enables use of the dictionary function with a simple operation performed while browsing the electronic book.

Furthermore, the server apparatus 100 performs dictionary search on the one or more dictionary databases associated with the user in advance. Consequently, it is possible to effectively utilize the dictionary purchased by the user, and obtain information whose source is clear by dictionary search.

Furthermore, as illustrated in FIG. 9, the server apparatus 100 displays the headword as a dictionary search result. Consequently, even when search results are obtained from multiple dictionaries, the user can select necessary information, and can quickly access the information that is necessary for the user.

Furthermore, the server apparatus 100 performs processing of cancelling division of the electronic book area 10, and causing the area (display area 50) wider than the display area 31 in the electronic book area 10 to display the contents of the electronic book according to the user's operation. Consequently, in a case where the user does not use the dictionary function, the user can browse the electronic book while causing the wider area to display the contents of the electronic book, and can use the dictionary function as necessary.

Second Embodiment

Figure 11:
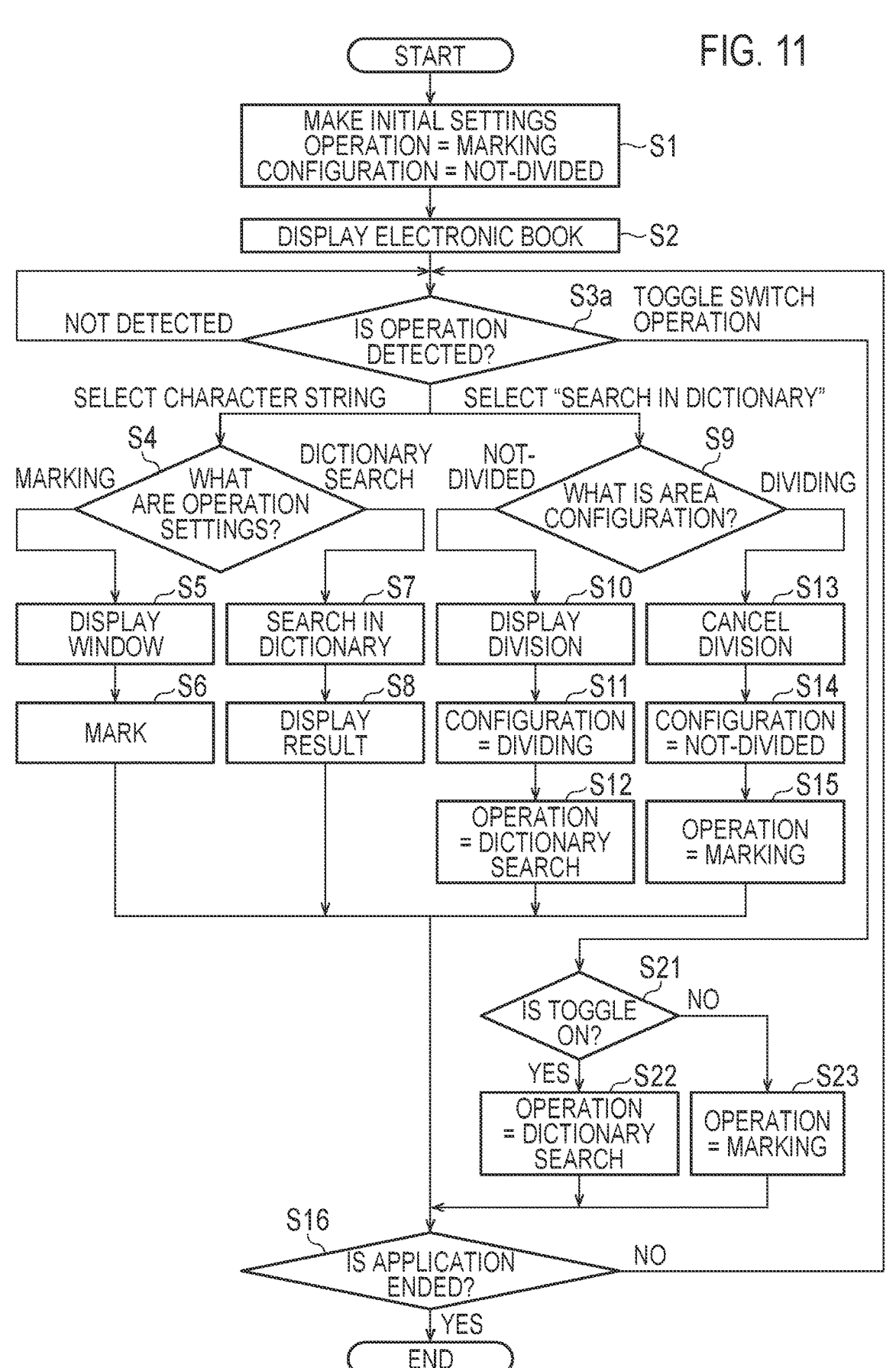
FIG. 11 is a flowchart of processing performed by a server apparatus according to a second embodiment.
Figure 12:
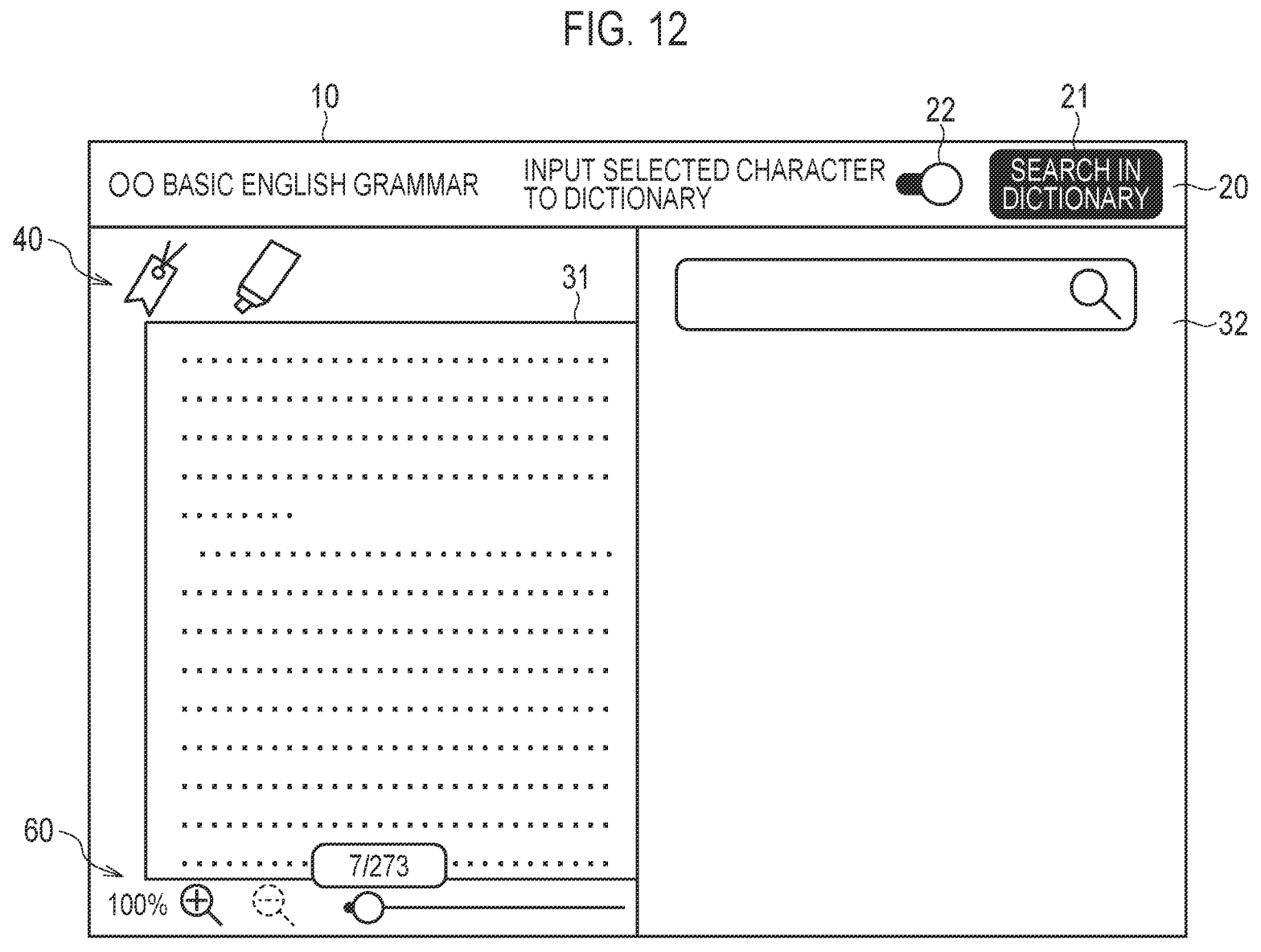

FIG. 11 is a flowchart of processing performed by a server apparatus according to the present embodiment. FIGS. 12 to 14 are views illustrating display states of an electronic book. Hereinafter, a change in the display state caused by a user's operation on a web browser that displays the electronic book will be more specifically described with reference to FIGS. 11 to 14.

Note that the server apparatus according to the present embodiment employs the same configuration as a server apparatus 100 according to the first embodiment illustrated in FIG. 2. The server apparatus according to the present embodiment differs from the server apparatus 100 according to the first embodiment in that processing illustrated in FIG. 11 is executed in place of the processing illustrated in FIG. 4. The processing illustrated in FIG. 11 differs from the processing illustrated in FIG. 4 in including step S3a in place of step S3 and including steps S21 to S23.

Furthermore, as illustrated in FIG. 12, the server apparatus according to the present embodiment also differs from the server apparatus 100 in that a toggle switch 22 is displayed or enabled in an electronic book area 10 in a divided state. Each of above-described steps S3a and S21 to S23 is a step related to the toggle switch 22. Note that enabling refers to bringing the disabled toggle switch 22 into an operable state, and is irrelevant to an ON state or an OFF state of the toggle switch 22 described later. Furthermore, the disabled toggle switch 22 refers to the toggle switch 22 that is displayed yet cannot be operated.

The toggle switch 22 is a part (hereinafter, referred to as a component) of a user interface that indicates settings of an operation on a selected character string, and also functions as input means for switching the settings of the operation on the selected character string. The ON state (a state where a circle is on the right) of the toggle switch 22 as illustrated in FIG. 12 indicates that the settings of the operation on the selected character string are dictionary search. Furthermore, an OFF state (a state where a circle is on the left) of the toggle switch 22 as illustrated in FIGS. 13 and 14 indicates that the settings of the operation on the selected character string are marking.

According to the server apparatus according to the present embodiment, in step S3a, the server apparatus 100 also monitors the character string selection operation and the operation on a button 21, and, in addition, the operation on the toggle switch 22, and detects these operations.

According to the processing illustrated in FIG. 11, since the configuration of the electronic book area 10 is set to not-divided by the initial settings in step S1, the toggle switch 22 is subsequently hidden or disabled until the button 21 is selected and the configuration of the electronic book area 10 is set to dividing by processing in step S11.

While the toggle switch 22 is displayed or enabled by setting the configuration of the electronic book area 10 to dividing in step S11, an operation on the character string is set to dictionary search in step S12 at this time, and the toggle switch 22 is displayed or enabled in the ON state. FIG. 12 illustrates a display state of the electronic book at a time of an end of step S12.

Note that, even if the toggle switch 22 is displayed or enabled, as long as the user does not subsequently operate the toggle switch 22, the processing performed by the server apparatus according to the present embodiment is the same as the processing performed by the server apparatus 100. Therefore, detailed description of steps S1 to S15 will be omitted.

When the user operates the toggle switch 22 in the divided state where the toggle switch 22 is displayed or enabled, the server apparatus 100 detects that the toggle switch 22 has been operated in step S3*a*, and determines the state of the toggle switch 22 after the operation (step S21).

The server apparatus 100 sets the operation on the selected character string to "dictionary search" in a case where the toggle switch 22 is in the ON state (step S22), and sets the operation on the selected character string to "marking" in a case where the toggle switch 22 is in the OFF state (step S23). That is, the server apparatus 100 executes processing of switching the operation on the character string selected in the display area 31 between dictionary search for the character string and an operation other than the dictionary search (marking in this case) according to the user's operation on the component (toggle switch 22) that is displayed or enabled in a state where the operation on the character string is dictionary search for the character string.

In this way, by operating the toggle switch 22 in the divided state, and changing the settings of the operation on the selected character string, it is possible to properly use dictionary search and marking while displaying a dictionary area 32. Consequently, by, for example, changing the toggle switch 22 to the OFF state after a search result (explanation sentence 34) of the searched character string ("output" in this example) is displayed in the dictionary area 32 as illustrated in FIG. 13, it is possible to mark an arbitrary character string C1 while displaying the search result (explanation sentence 34) for the certain character string as illustrated in FIG. 14.

The server apparatus according to the present embodiment that executes the processing illustrated in FIG. 12 can also enable use of the dictionary function while maintaining a comfortable reading environment of electronic books similar to the server apparatus 100 that performs the processing illustrated in FIG. 4. Furthermore, while the settings of the configuration of the electronic book area 10 and the settings of the operation on the selected character string are automatically linked under a certain situation in the server apparatus according to the present embodiment, the user can manually adjust the relationship between these settings as necessary.

The above-described embodiments have described specific examples to facilitate understanding of the disclosure, and the present invention is not limited to the above-described embodiments, and should be understood that the present invention covers various modifications and alterations of the above-described embodiments. For example, it will be understood that the above-described embodiments can be embodied by modifying components without departing from the gist and the scope of the present invention. Furthermore, it will be understood that various embodiments can be carried out by appropriately combining a plurality of components disclosed in the above-described embodiments. Furthermore, a person skilled in the art will understand that various embodiments may be carried out by deleting some components from all components described in the embodiments or adding some components to the components described in the embodiments. That is, the information processing apparatus, the operation method, and the recording medium can be variously modified and changed without departing from the recitation of the claims.

Although the above-described embodiments have described the examples where the operation on the character string is switched between dictionary search and marking according to a user's operation on the toggle switch 22, the server apparatus 100 may perform processing of switching the operation on the character string between dictionary search for the character string and an operation other than dictionary search according to the operation of the user. For example, a function of adding a bookmark instead of marking, and dictionary search may be switched. Furthermore, three or more functions including dictionary search may be switched, and, for example, dictionary search, marking, and a function of adding a bookmark may be switched. In this case, another component that can select three or more states may be used instead of the toggle switch 22.

Furthermore, although the above-described embodiments have described the examples where the toggle switch 22 is arranged in the area 20, the toggle switch 22 may be provided in the dictionary area 32. Consequently, the toggle switch 22 is displayed when the dictionary area 32 is displayed, and the toggle switch 22 is not displayed, either, when the dictionary area 32 is not displayed, so that it is possible to simplify display control.

Furthermore, although the above-described embodiments have described the examples where display and hide of the dictionary area 32 are switched by operating the button 21, display and hide of the dictionary area 32 are not limited to an operation on a part (component) of a graphical user interface such as the button 21, and may be switched according to other user operations. Unlike switching between dictionary search and an operation other than dictionary search, it is not necessary for switching between display and hide of the dictionary area 32 to limit a timing at which the user can perform an operation of switching. Consequently, for example, display may be switched at an arbitrary timing according to a predetermined key operation or the like.

Although the above-described embodiments have described the examples where dictionary search is performed using a dictionary database that has been, for example, purchased and thereby become available to the user, Internet search may be performed in addition to dictionary search that uses the dictionary database. In this case, an Internet search result may be displayed together with a dictionary search result in the dictionary area 32. In this case, it is desirable to display the dictionary search result and the Internet search result in a distinguishable manner.

Figure 15:
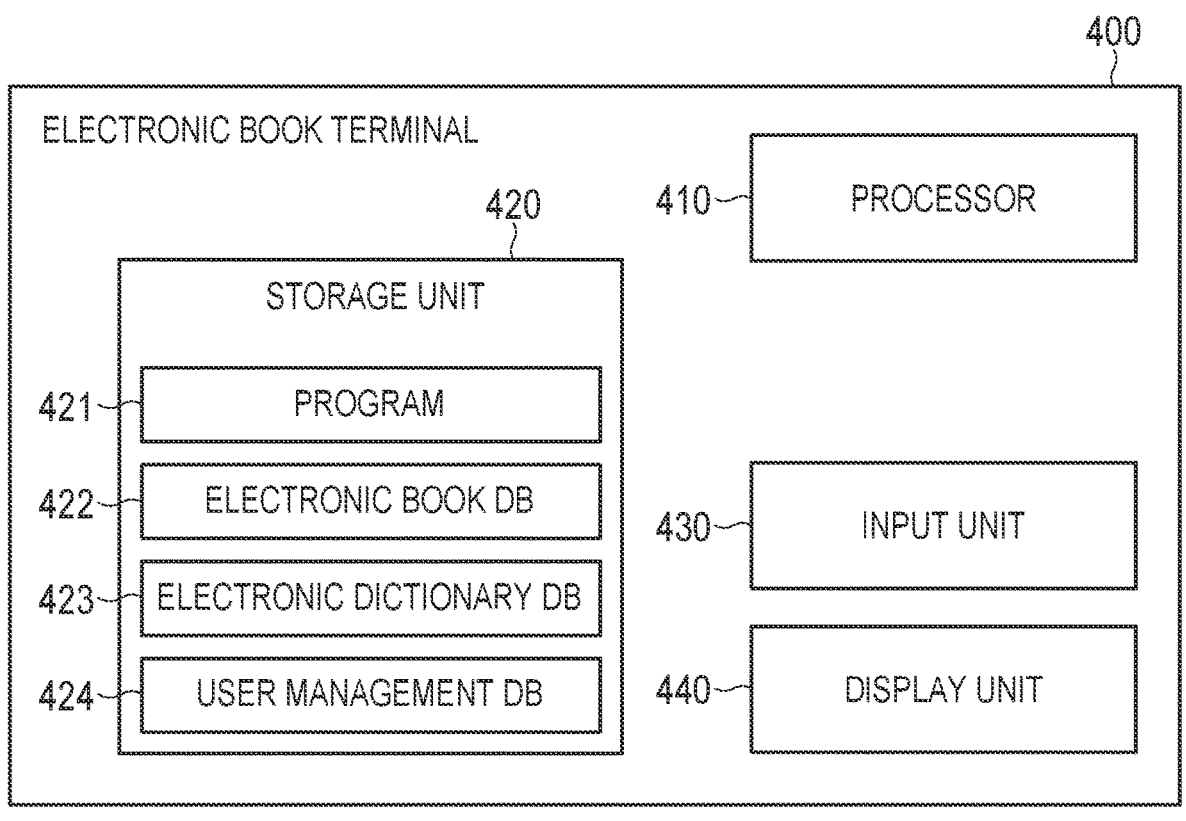
FIG. 15 is a view illustrating a configuration of an electronic book terminal.

Although the above-described embodiments have described the examples where the server apparatus side performs display control, a client terminal side may perform display control. Furthermore, in a case of, for example, an electronic book terminal 400 including a program 421 and databases (an electronic book database 422, an electronic dictionary database 423, and a user management database 424) in a storage unit 420 as illustrated in FIG. 15, the client terminal (electronic book terminal 400) side may perform not only display control, but also database search and the like. In this case, the electronic book terminal 400 may not be connected to a network 300, the processor 410 may execute the above-described processing in FIGS. 4 and 11 by executing the program 421 stored in the storage unit 420, and may change a display state of an electronic book displayed on a display 440 according to a user's operation on an input unit 430.

Although the above-described embodiments have described the examples where an instruction is made to divide an area in addition to the operation of selecting a character string, the present invention is not particularly limited to these embodiments. A processor 110 may perform processing of dividing the electronic book area on the display screen into the first display area and the second display area according to the user's designation operation on the character string included in the electronic book area, and causing the first display area and the second display area to display contents of the electronic book and the dictionary area related to the dictionary function, respectively.

What is claimed is:

1. An information processing apparatus comprising:

a memory; and at least one processor which, under control of a program stored in the memory, is configured to execute processes comprising:

controlling to display an electronic book within a predetermined display area on a display;

controlling to divide the predetermined display area into a first display area in which contents of the electronic book are displayed and a second display area in which a dictionary search result is displayed, and to begin displaying a predetermined operation button on the display;

receiving, by an input operation by a user, selection of a character string within the first display area, performing search processing to obtain a dictionary search result with respect to the character string, and displaying the dictionary search result with respect to the character string in the second display area; and in response to the predetermined operation button being operated by the user while the dictionary search result with respect to the character string is being displayed in the second display area, beginning processing different from the search processing with respect to a new character string selected by the user within the first display area while maintaining the display of the dictionary search result with respect to the character string in the second display area, wherein the processing different from the search processing is processing for marking the character string selected by the user within the first display area, and wherein the processes further comprise:

controlling to disable dividing of the predetermined display area into the first display area and the second display area; and when a character string is selected by the user within the predetermined display area while the dividing of the predetermined display area into the first display area and the second display area is disabled, beginning the processing for marking the character string selected by the user within the predetermined display area.

2. The information processing apparatus according to claim 1, wherein the processing for marking the character string selected by the user comprises enabling the user to set a color applied to a marker and contents of a note registered in association with the marking.

3. A learning support method executed by an information processing apparatus displaying an electronic book within a predetermined display area on a display, the method comprising:

dividing the predetermined display area into a first display area in which contents of the electronic book are displayed and a second display area in which a dictionary search result is displayed, and beginning displaying a predetermined operation button on the display;

receiving, by an input operation by a user, selection of a character string within the first display area, performing search processing to obtain a dictionary search result with respect to the character string, and displaying the dictionary search result with respect to the character string in the second display area; and in response to the predetermined operation button being operated by the user while the dictionary search result with respect to the character string is being displayed in the second display area, beginning processing different from the search processing with respect to a new character string selected by the user within the first display area while maintaining the display of the dictionary search result with respect to the character string in the second display area, wherein the processing different from the search processing is processing for marking the character string selected by the user within the first display area, and wherein the processes further comprise:

controlling to disable dividing of the predetermined display area into the first display area and the second display area; and when a character string is selected by the user within the predetermined display area while the dividing of the predetermined display area into the first display area and the second display area is disabled, beginning the processing for marking the character string selected by the user within the predetermined display area.

4. The method according to claim 3, wherein the processing for marking the character string selected by the user comprises enabling the user to set a color applied to a marker and contents of a note registered in association with the marking.

5. A non-transitory computer-readable storage medium storing a program thereon for controlling a computer of an information processing apparatus displaying an electronic book within a predetermined display area on a display, the program being executable by the computer to cause the computer to perform processes comprising:

dividing the predetermined display area into a first display area in which contents of the electronic book are displayed and a second display area in which a dictionary search result is displayed, and beginning displaying a predetermined operation button on the display;

receiving, by an input operation by a user, selection of a character string within the first display area, performing search processing to obtain a dictionary search result with respect to the character string, and displaying the dictionary search result with respect to the character string in the second display area; and in response to the predetermined operation button being operated by the user while the dictionary search result with respect to the character string is being displayed in the second display area, beginning processing different from the search processing with respect to a new character string selected by the user within the first display area while maintaining the display of the dictionary search result with respect to the character string in the second display area, wherein the processing different from the search processing is processing for marking the character string selected by the user within the first display area, and wherein the processes further comprise:

controlling to disable dividing of the predetermined display area into the first display area and the second display area; and when a character string is selected by the user within the predetermined display area while the dividing of the predetermined display area into the first display area and the second display area is disabled, beginning the processing for marking the character string selected by the user within the predetermined display area.

6. The non-transitory computer-readable storage medium according to claim 5, wherein the processing for marking the character string selected by the user comprises enabling the user to set a color applied to a marker and contents of a note registered in association with the marking.

\* \* \* \* \*